Patented Oct. 30, 1928.

1,689,696

UNITED STATES PATENT OFFICE.

SAMUEL LEWIS SUMMERS, OF FORT WASHINGTON, PENNSYLVANIA.

ESTER OF SALICYLIC ACID AND PYRUVIC ACID.

No Drawing.      Application filed June 30, 1925. Serial No. 40,683.

This invention relates to a new and useful remedial or curvative compound and it also comprehends the method whereby said compound is preferably prepared.

The primary object of this invention is to provide a therapeutic agent, or remedial, which will be found especially efficacious in increasing the elimination of by-products resulting from defective metabolism—such as uric acid—and in the treatment of neuralgia of a gouty origin.

In carrying out my invention, I prepare the new therapeutic by heating a mixture of 138 parts of salicylic acid ($C_7H_6O_3$) and 176 parts of pyruvic acid ($CH_3.CO.COOH$) for two hours under a reflux condenser at a temperature of 160° C. The resultant mass is then cooled, and is freed from any uncombined pyruvic acid, by crystallizing it out with alcohol.

The new product is in the form of yellowish white needles which are easily soluble in alcohol, benzene, or glacial acetic acid and has the following chemical formula:—

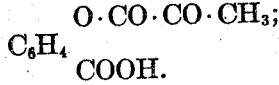

The new product is best obtained as the result of crystallizing it out with hot ethyl alcohol—or other solvent—from the cooled mixture aforesaid in which it is held in solution; and is chemically the pyruvic acid ester of salicylic acid. When administered internally the new product will be found a valuable remedial for defective metabolism and the ills incident thereto, and more particularly those of a gouty origin.

Although I have specified a concrete example of the ingredients used in producing my new and useful therapeutic, it is to be understood the proportions specified, as well as the time period involved, may be varied without departing from the scope of my invention as succinctly defined by the appended claims.

Having thus described my invention, I claim:

1. As a new therapeutic agent the chemical reaction product of salicylic acid and pyruvic acid substantially in the proportions of 1 part of the former to 1.23 parts of the latter.

2. As a new therapeutic agent the chemical reaction product of 138 parts of salicylic acid and 176 parts of pyruvic acid.

3. The process of producing a therapeutic agent which consists in thoroughly mixing 138 parts of salicylic acid with 176 parts of pyruvic acid, and maintaining said mixture under reflux condensing action for two hours at a temperature of 160° C.

4. The process of producing a therapeutic agent which consists in thoroughly mixing 138 parts of salicylic acid with 176 parts of pyruvic acid, maintaining said mixture under reflux condensing action for two hours at a temperature of 160° C., and then cooling the resultant product.

5. The process of producing a therapeutic agent which consists in thoroughly mixing 138 parts of salicylic acid with 176 parts of pyruvic acid, maintaining the mixture under reflux condensing action for two hours at a temperature of 160° C., cooling the resultant product, and then freeing any uncombined pyruvic acid by alcoholic crystallization.

In testimony whereof, I have hereunto signed my name at Ambler, Penna., this 24th day of June, 1925.

SAMUEL LEWIS SUMMERS.